(12) United States Patent
Nebout et al.

(10) Patent No.: US 9,664,289 B2
(45) Date of Patent: May 30, 2017

(54) PUMP SEALING DEVICE

(71) Applicant: General Electric Technology GmbH, Baden (CH)

(72) Inventors: Nicolas Nebout, Paris (FR); Guillaume Becouarn, Paris (FR)

(73) Assignee: General Electric Technology GmbH, Baden (CH)

( * ) Notice: Subject to any disclaimer, the term of this patent is extended or adjusted under 35 U.S.C. 154(b) by 163 days.

(21) Appl. No.: 13/909,567

(22) Filed: Jun. 4, 2013

(65) Prior Publication Data

US 2014/0353922 A1 Dec. 4, 2014

(30) Foreign Application Priority Data

Jun. 6, 2012 (FR) ...................................... 12 55283

(51) Int. Cl.
*F16J 15/34* (2006.01)
*F04D 29/12* (2006.01)
*F16J 15/16* (2006.01)

(52) U.S. Cl.
CPC ........ *F16J 15/3404* (2013.01); *F04D 29/124* (2013.01); *F04D 29/128* (2013.01); *F16J 15/162* (2013.01)

(58) Field of Classification Search
CPC .... F16J 15/3404; F04D 29/124; F04D 29/128
USPC ................................................. 277/408, 930
See application file for complete search history.

(56) References Cited

U.S. PATENT DOCUMENTS

| 2,824,759 | A | * | 2/1958 | Tracy | 277/399 |
| 3,477,729 | A | * | 11/1969 | Hershey | 277/306 |
| 3,677,729 | A | | 7/1972 | Plumat | |
| 3,843,140 | A | * | 10/1974 | Mayer et al. | 277/408 |
| 3,968,969 | A | * | 7/1976 | Mayer et al. | 277/408 |
| 4,128,362 | A | * | 12/1978 | Shepherd et al. | 415/112 |
| 5,412,977 | A | * | 5/1995 | Schmohl et al. | 73/46 |
| 5,468,002 | A | * | 11/1995 | Wasser | 277/361 |
| 5,658,127 | A | * | 8/1997 | Bond et al. | 277/399 |
| 5,722,671 | A | * | 3/1998 | Nosowicz et al. | 277/408 |
| 6,708,980 | B2 | * | 3/2004 | Takahashi | 277/380 |
| 2014/0232070 | A1 | * | 8/2014 | Takigahira et al. | 277/408 |

FOREIGN PATENT DOCUMENTS

| CH | 560341 A5 | 3/1975 |
| CN | 101493096 A | 7/2009 |
| DE | 3925403 C2 | 12/1993 |

(Continued)

OTHER PUBLICATIONS

Office action issued from Chinese Patent Office dated May 6, 2015 for CN Application No. 201310222946.8.

(Continued)

*Primary Examiner* — Nicholas L Foster
(74) *Attorney, Agent, or Firm* — GE Global Patent Operation; Cynthia W. Flanigan

(57) ABSTRACT

Described is a device (1) for sealing a power station pump. The device (1) includes a pump housing (10) with first and second ducts (15, 16) for passage of a fluid, and a shaft (20) including a first passage (51) for the fluid, a mechanical packing (70) mounted between the shaft (20) and the pump housing (10) and friction elements for rubbing-together a rotating part (71) and a stationary part (72).

8 Claims, 1 Drawing Sheet

(56) References Cited

FOREIGN PATENT DOCUMENTS

| | | |
|---|---|---|
| DE | 29721325 U1 | 2/1998 |
| DE | 19724308 A1 | 12/1998 |
| FR | 2388148 A1 | 11/1978 |
| FR | 2607874 A1 | 6/1988 |
| GB | 2106593 A | 4/1983 |
| JP | H03-106373 A | 5/1991 |
| SU | 832193 A1 | 5/1981 |
| SU | 943451 A1 | 7/1982 |

OTHER PUBLICATIONS

Unofficial English translation of Russian NOA Action issued in connection with corresponding RU Application No. 2013125972 on Jun. 5, 2013.

Heinzler et al., "Table Book Metal", Europa Lehrmittal, pp. 66, 2014.

* cited by examiner

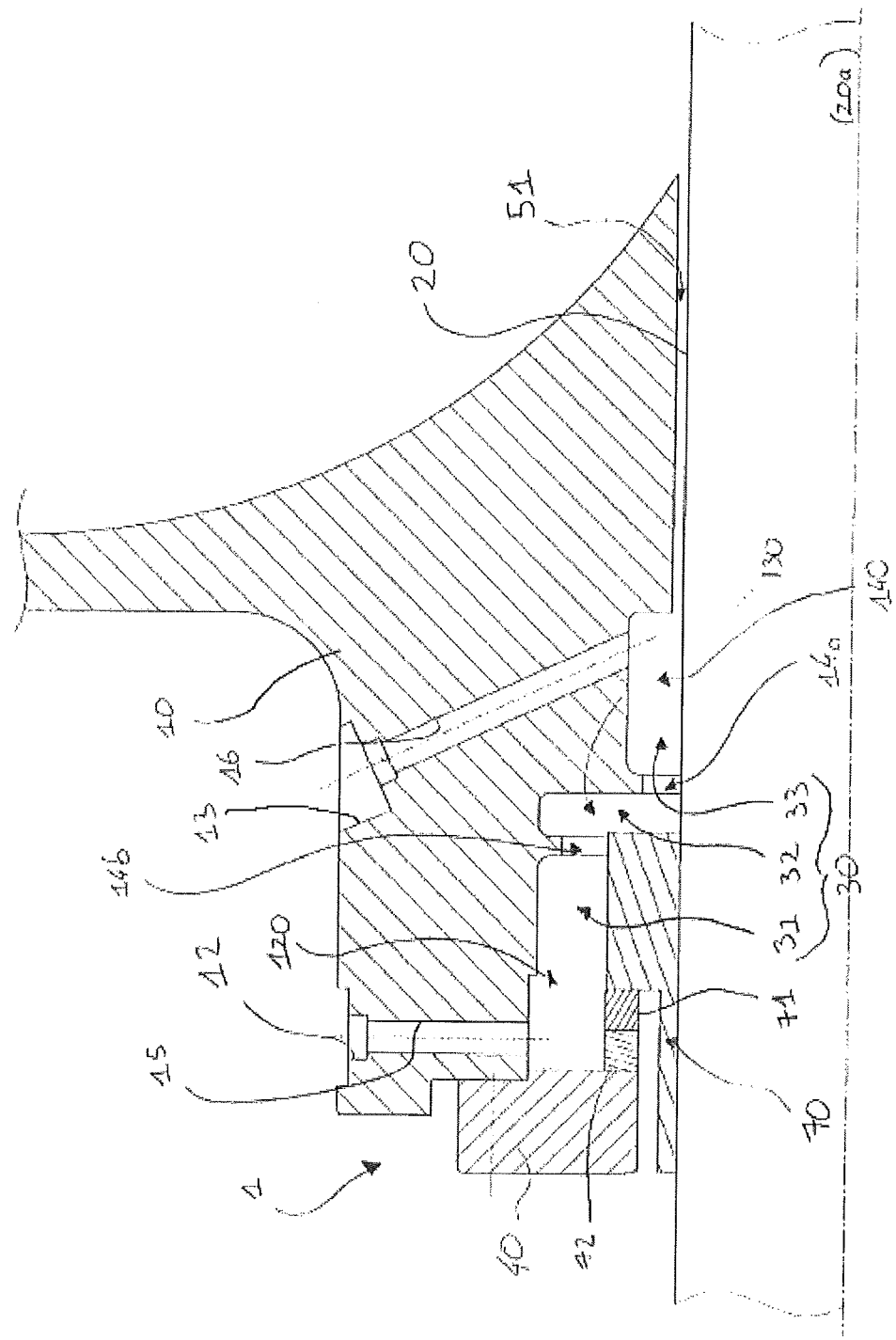

PUMP SEALING DEVICE

CROSS-REFERENCE TO RELATED APPLICATIONS

This patent application claims benefit under 35 U.S.C. §119(a) of co-pending FR Patent Application Number 1255283 entitled "PUMP SEALING DEVICE" filed Jun. 6, 2012, the substantially identical disclosure of which is incorporated by reference herein in its entirety.

TECHNICAL FIELD

This relates to a pump sealing device. More specifically, it relates to a device for sealing a pump of a nuclear power station. It may also relate to a fossil fuel power station, notably one producing electricity by burning coal, oil or natural gas. In the case of a nuclear power station, it is a pump the function of which is to send water to heaters situated before the inlet to the reactor.

BACKGROUND

The thermal barrier function and function of cooling the friction elements of mechanical packing are performed by tappings (ducts with (an) inlet(s) and (an) outlet(s) that feed certain zones are defined as tappings) arranged in the pump housing, the mechanical packing and in the fluid header if there is one. Existing techniques make maintenance difficult because piping has first of all to be removed. Moreover, having numerous tappings in standard components increases costs, notably because of the need to make the holes and weld on the supply piping. Furthermore, the cooling water comes from two different circuits, namely an auxiliary cooling circuit used for the thermal barrier function and another circuit for cooling the friction elements of the mechanical packing using water from the pump and an external heat exchanger.

Such devices make sealing-device maintenance difficult in so far as the tappings are made in the mechanical packing and in the pump housing.

That being the case, the problem set here is that of producing a pump sealing device of the abovementioned type, which is of simple construction and facilitates maintenance of said device and improves the life of the device. The present invention also seeks to combine two functions into one and the same single sealing device where there is just one cooling circuit the purpose of which is to cool the friction elements of the mechanical packing and to form a thermal barrier that protects the mechanical packing from heat, so as to lengthen the life of the device. The mechanical packing provides sealing at the end of a shaft and on the outside of the pump housing. The temperature of the mechanical packing and of the water flowing near the mechanical packing must not exceed a threshold temperature, conventionally 100° C. Now, typically, the water circulating through the pump is at a temperature of around 200° C. Bearing in mind the mechanical properties of the packing and notably of the stationary and rotating face rings (the stationary and rotating friction elements of the mechanical packing are defined as the stationary and rotating face rings) and how they are arranged in the sealing device, it is important to protect them from excessive heat in order to protect them from degradation. What happens is that an exchange of heat by conduction between the pump housing and the mechanical packing may impair correct operation of the seal and notably may impair sealing at the point between the stationary face ring and the rotating face ring. Moreover, friction between the rotating part of the mechanical packing defined by the rotating face ring of the packing on the one hand, and the stationary part defined by the stationary face ring of the packing on the other hand, dissipates energy in the form of heat, leading to a rise in temperature and to premature wear of the stationary and rotating face rings. Thus, in order to lengthen the life of the mechanical packing, provision is made for the mechanical packing to be cooled at the places where the friction occurs, namely at that point in the mechanical packing and, more specifically, at the point where there is relative motion between the rotating face ring and the stationary face ring.

Furthermore, the present invention seeks notably to optimize the maintenance of the sealing device and to lengthen the life of the sealing device. Another object of the present invention is to reduce the number of components that make up the sealing device and at the same time to reduce the costs of manufacturing a pump sealing device.

The solution proposed by the present invention is that the device for sealing a pump comprises:
- a pump housing comprising first and second ducts for the passage of a fluid;
- a shaft comprising, near the pump housing, a first passage for the fluid;
- a mechanical packing mounted between the shaft and the pump housing and comprising friction elements for the rubbing-together of a rotating part and of a stationary part,
- said device having two states, a shut down first state in which no fluid circulates through said device and an operating second state in which the fluid flows in a flow circuit passing via:
- the first passage to supply the circuit with fluid,
- a second passage comprised between the pump housing and the packing and communicating with said friction elements, the second passage then forming a means of cooling the friction elements and a thermal barrier,
- the first duct to supply the second passage with cooled fluid,
- the second duct to remove the hot fluid from the second passage.

Such an arrangement advantageously allows maintenance to be made easier and allows the life of the sealing device to be lengthened while at the same time reducing the number of components that make up the device and the cost of manufacturing such a component. The pump housing, the shaft and the mechanical packing together incorporate a means of cooling the friction elements and a thermal barrier, which therefore need to be supplied with fluid. The present invention proposes using a single circuit to supply both the means for cooling the friction elements and the thermal barrier via the second passage. Some of the fluid circulating through the second passage has the function of cooling the mechanical packing adjacent to this second passage, so as to lower the temperature of the friction elements therefore allowing pump usage with no risk of leakage; this then prevents pump water from coming into contact with the external surroundings. Another proportion of the fluid circulating through the second passage has the function of forming a thermal barrier so as to protect the packing, notably the friction elements thereof, from the heat dissipated by the pump housing and caused by the hot water circulating through said pump.

The flow circuit followed by the fluid advantageously makes it possible to reduce the number of components of which the device is made. More specifically, all the arrangements of pump housing, shaft and packing, correlated with the fluid circuit offers the benefit of a reduced number of components while at the same time offering optimized means of protecting the packing and the friction elements thereof.

In one embodiment, a first chamber extends radially between the packing and the pump housing and axially between the cover and a fourth passage.

In one embodiment, the device might comprise a second chamber comprised between the pump housing on the one hand and the packing on the other and might define, in the operating state, a second thermal barrier.

In another embodiment, the above-mentioned second chamber is bounded:
radially, by the shaft and a bore formed in the pump housing,
axially, by the packing and the pump housing.

In another embodiment, a gap runs longitudinally between the shaft and the pump housing, said gap running circumferentially and defining, in the operating state, a third thermal barrier.

In yet another embodiment, the pump housing might comprise a third passage providing communication between said second and third thermal barriers.

In another embodiment of the invention, the third passage immediately faces, in the axial direction, the lateral part of the stationary face ring.

In another embodiment, a first passage between the shaft and the pump housing is intended for circulating the fluids from the pump toward the gap.

In one embodiment, the second passage might comprise said first and second chambers, the fourth passage, a third passage providing communication between the second chamber and the gap, and the gap.

In yet another embodiment, the second operating state is triggered by the shaft beginning to rotate.

In another embodiment of the invention, the sealing device further comprises a fluid-cooling device connected to first and second ducts.

BRIEF DESCRIPTION OF THE FIGURE

Other features and advantages will become further apparent from the description given hereinafter, by way of entirely nonlimiting indication, with reference to the attached drawing in which:
the FIGURE shows half of a cross section through one example of a sealing device according to the present disclosure.

DETAILED DESCRIPTION

Two sealing devices 1 are provided to prevent pressurized hot water from getting out into the external atmosphere while at the same time not impeding the rotation of a shaft 20. Each of the two sealing devices 1 is positioned at each exit of the shaft 20. the FIGURE depicts just one device 1.
Each of the devices 1 comprises:
a pump housing 10 which contains pressurized hot water and energy recuperation components;
a rotary shaft 20 supporting the impellor the vanes of which impart motor power to this hot water, said shaft 20 emerging from the housing 10 on each side to rest on bearings; one of its ends is coupled to a drive system, not depicted; the exits of the shaft 20 are sealed by sealing devices 1;
a cover 40 fixing a mechanical packing 70 to the pump, and more specifically to the inside of the pump housing 10; it is fixed to the pump housing 10 by fixing means;
a mechanical packing 70 comprising a rotating face ring 71 and a stationary face ring 72 defining friction elements which respectively constitute a rotating part 71 and a stationary part 72;
the rotating face ring 71 rotating with the shaft 20 and in surface-to-surface contact with the stationary face ring 72; sealing occurring at the interface between these two face rings;
the stationary face ring 72, kept pressed against the rotating face ring 71, may have the ability to move only translationally;
a rotating face ring carrier, holding the rotating face ring 71;
a non-rotating face ring carrier, holding the stationary face ring 72 and allowing the face ring 72 to move in a translational movement;
a mechanical packing liner, connected to the shaft 20; this constitutes a wall of the mechanical packing 70 in contact with the shaft 20 while protecting it.

The sealing device 1 is intended to be positioned between the rotary shaft 20 and the pump housing 10. More specifically, the device 1 is arranged at the exit of the shaft 20, outside the pump housing 10, so as to prevent pressurized hot water circulating in the pump housing 10 from flowing out of said housing 10. Furthermore, the sealing device 1, the rotary shaft 20 and the pump housing 10 are arranged together in such a way as not to impede the rotation of the shaft 20 with respect to the pump housing 10. The shaft 20 rotates about an axis 20a.

The mechanical packing 70, defining a sealing means, is fitted to the sealing device 1. The mechanical packing 70 comprises said stationary sealing face ring 72 connected in a fluidtight manner to the pump housing 10 and said rotating sealing face ring 71 connected in a fluidtight manner to the rotary shaft 20. When the shaft 20 rotates about its axis 20a, the rotating face ring 71 rubs against the stationary face ring 72 over an annular friction surface. The stationary face ring 72 and the rotating face ring 71 each respectively has: radially outer surfaces and radially inner surfaces. At least a portion of the radially outer surfaces communicate with a first chamber 120 defining an exchange zone. The first chamber 120, defining an exchange zone, is comprised between that part of the packing 70 that is oriented radially toward the outside and the pump housing 10; this first chamber 120 is adjacent to the friction elements formed by the stationary face ring 72 and rotating face ring 71. In the operating state, the first chamber 120 contains a fluid for cooling the friction elements. When the circuit is in the operating state and when the first chamber 120 contains a cooled fluid, then a first thermal barrier 31 runs between the packing 70 and the housing 10, said first thermal barrier being formed by the first chamber 120 filled with a fluid. Preferably, the first chamber 120 runs radially between the packing 70 and the pump housing 10 and axially between the cover 40 and a fourth passage 14b.

The device 1 may comprise face ring pressing means to press the stationary face ring 72 and the rotating face ring 71 axially against one another. The purpose of these means is to maintain contact between the stationary face ring 72 and the rotating face ring 71.

In one embodiment of the invention, the cover 40 defines a cap. According to this embodiment, the cover 40 is arranged between the pump housing 10 and the mechanical packing 70—straddling the pump housing 10 and the packing 70. Its purpose is to incorporate the mechanical packing 70 within the pump housing 10 and then hold it fixedly in position.

The arrangements of ducts, passages and tappings in the pump housing 10, and between the pump housing 10 and the shaft 20, notably in the region of the packing 70, have two main functions to form a thermal barrier 30 between the pump housing 10 and the mechanical packing 70;

to cool the mechanical packing 70 and more specifically the stationary face ring 72 and the rotating face ring 71.

Thus, the circulation of a fluid through the aforementioned ducts is aimed essentially at protecting the mechanical packing 70 from external harm, notably the harmful effects of heat, and to lengthen its life.

Preferably, the thermal barrier 30 is made up of the first thermal barrier 31, of the second thermal barrier 32 and of the third thermal barrier 33.

The pump housing 10 comprises first and second tappings 12, 13 communicating respectively with first and second ducts 15, 16. The first tapping 12 and the first duct together supply the thermal barrier 31 and the friction elements 71, 72 with cooled fluid, while the second tapping 13 and the second duct 16 together remove the hot fluid contained in the third thermal barrier 33.

According to an embodiment that has not been depicted, by means of a suitable arrangement of the cover 40 with the pump housing 10, the first duct 15 communicates with a third duct arranged in the cover 40. This third duct communicates with the first chamber 120. Arranged in this way, the first duct 15 and the third duct supply the first chamber 120 with fluid, and this causes the stationary face ring 72 and the rotating face ring 71 to be immersed in a fluid for cooling purposes.

The first chamber 120 defines a radial space between the packing 70 and an internal wall of the housing 10. The second chamber 130 defines an axial space between the housing 10 and the packing 70. As shown in the FIGURE, the second chamber 130 is radially bounded by the shaft 20 and a bore formed in the pump housing 10; it is bounded axially, over a portion of a first side of said second chamber, by the mechanical packing and possibly by a wall of the pump housing 10 and, over a portion of a second side of said second chamber, by the pump housing 10. This second chamber 130 comprises, on its first side, a fourth passage 14b (also referred to as the first chamber passage) forming a communication between the first chamber 120 and the second chamber 130, and on its second side a third passage 14a (also referred to as the second chamber passage) forming a communication between the second chamber 130 and the gap 140.

In the operating state, the fluid contained in the first chamber 120 will therefore flow into the fourth passage 14b before completely or partially filling the second thermal barrier 32 defined by the aforementioned second chamber. the FIGURE shows us that the thermal barriers 31, 32 are substantially annular in shape.

The second thermal barrier 32 communicates with a third thermal barrier 33 via a third passage 14a arranged in the pump housing 10. The third passage 14a immediately, in the axial direction, faces the lateral part of the stationary face ring 72; further, the third passage 14a and the lateral part of the stationary face ring 72 are separated from the second thermal barrier 32.

The third passage 14a communicates with a gap 140 running circumferentially along the shaft 20. As depicted in the FIGURE, the gap 140 runs between the pump housing 10 and the rotary shaft 20. In the operating state, the fluid contained in the second thermal barrier 32 will therefore circulate toward the gap 140 via the third passage 14a in order to ensure continuity with the second thermal barrier 32 and prevent heat from being transferred from the pump housing 10 to the shaft 20. When filled with fluid, the gap 140 defines a third thermal barrier 33.

The second tapping 13 is arranged in the pump housing 10. It runs between the gap 140 and an exterior surface of the pump and allows hot fluid to be removed to outside the mechanical assembly formed by the pump housing 10, the packing 70 and the shaft 20 and possibly the cover 40. Preferably, the hot fluid is discharged to a fluid cooling device, of the heat exchanger type.

In one embodiment, in order to supply the cooling circuit with fluid, use is made of a first passage 51 (also referred to as a supply passage) between the rotary shaft 20 and the bore of the pump housing 10. More specifically, fluid from the pump can flow to the gap 140 (also referred to as a third chamber), said gap 140 and said first passage communicating with one another. In this embodiment, the cooling circuit is supplied via the fluid removed from the pump. Thus, the device 1 has two states: a shut down first state in which no fluid circulates through the device 1, and an operating second state in which the fluid follows a flow circuit passing via:

the first passage 51 in order to supply the circuit with fluid, a second passage comprised between the pump housing 10, the packing 70 and the shaft 20, and communicating with the friction elements, the second passage then forming a means for cooling the friction elements and a thermal barrier 30, the first tapping 12 to supply the second passage with cooled fluid, the second tapping 13 to remove the hot fluid from the second passage.

In the shut down first state, the water from the pump is in all the gaps 120, 130, 140, 14a, 14b. In the operating second state, rotation of the shaft 20 allows the circuit supplying the packing 70 and the thermal barriers 31, 32, 33 to begin to circulate.

Furthermore, it should be emphasized that fluid from the pump flows, in an unwanted manner, between the shaft 20 and the pump housing 10 at the passage 51. Provision is therefore made to put this fluid to good use by making it flow through the circuit. The leakage between the pump housing 10 and the shaft 20 then becomes advantageous.

Preferably, the second passage comprises the first chamber 120, the fourth passage 14b, the second chamber 130, the third passage 14a and the gap 140.

In one embodiment, the second passage might, and this list is not exhaustive, comprise: the first chamber 120 cooling the friction elements in a fluid and defining the first thermal barrier 31, the second chamber 130 defining the second thermal barrier 32, and the gap 140 defining the third thermal barrier 33. The fourth passage 14b provides communication between the first and second chambers 120, 130. The fourth passage 14b provides communication between the first thermal barrier 31 and the second thermal barrier 32. The third passage 14a provides communication between the second thermal barrier 32 defined by the second chamber 130 and the third thermal barrier 33 defined by the gap 140.

The invention claimed is:

1. A device for sealing a power station pump, said device comprising:

a pump housing comprising first and second ducts fluidly connected together by a first chamber with a passage, a second chamber with a passage and radially bounded by a shaft, and a third chamber, each arranged between the first and second ducts for passage of a fluid there through, with the first chamber and the third chamber arranged radially at differing distances from the shaft, and the second chamber arranged axially between the first chamber and the third chamber with the first chamber and the third chamber arranged at opposite axial ends of the second chamber with the first chamber arranged at a first of the opposite axial ends of the second chamber and arranged a first radial distance from the shaft, and the third chamber arranged at a second of the opposite axial ends of the second chamber and bound by the shaft; a third duct arranged in a pump housing cover, the pump housing cover fixing a stationary face ring of a mechanical packing to the pump housing, wherein the third duct communicates with the first duct and the first chamber, and wherein the passages of the first and second chambers are substantially smaller than the first, second, and third chambers;

the shaft arranged near the pump housing with a supply passage arranged therebetween fluidly connected to the third chamber and supplying fluid to the third chamber, and wherein the shaft has a sleeve attached thereto, the sleeve holding a rotating face ring of the mechanical packing; and the mechanical packing mounted on an outer side of the pump housing between the shaft and the pump housing to provide a seal therebetween, with said stationary and rotating face rings of said mechanical packing for cooperating via rubbing-together, and with the first chamber bound by the pump housing, the pump housing cover, the sleeve of the shaft, and the mechanical packing;

with said device having two states, a shutdown first state in which no fluid circulates through said device and an operating second state in which the fluid flows in a flow circuit passing, in order, from the first duct, to the first chamber, to the first chamber passage, to the second chamber, to the second chamber passage, to the third chamber with a supply of fluid flowing into the third chamber from the supply passage, and to the second duct;

with the first duct, the third duct, and the supply passage supplying cooled fluid to the device, and the second duct removing hot fluid from the device.

2. The device as claimed in claim 1, wherein the first chamber extends radially between the mechanical packing and the pump housing and axially between the pump housing cover and the first chamber passage.

3. The device as claimed in claim 1, wherein the first chamber extends radially between the mechanical packing and the pump housing and axially between the pump housing cover and the first chamber passage to define a first thermal barrier, and the second chamber extends between the pump housing and the mechanical packing to define a second thermal barrier.

4. The device as claimed in claim 1, wherein the first chamber extends radially between the mechanical packing and the pump housing and axially between the pump housing cover and the first chamber passage, and the second chamber extends radially between the shaft and the pump housing and axially between the sleeve of the shaft and the second chamber passage.

5. The device as claimed in claim 1, wherein the third chamber extends radially between the shaft and the pump housing and axially between the second chamber passage and the supply passage to define a third thermal barrier.

6. The device as claimed in claim 1, wherein the third chamber extends between the shaft and the pump housing.

7. The device as claimed in claim 1, wherein the sealing device further comprises a fluid-cooling device connected between the first duct and the second duct.

8. The device as claimed in claim 1, wherein the device is arranged to direct fluid leaked between the pump housing and the shaft to flow in the flow circuit.

* * * * *